(12) United States Patent
Kim

(10) Patent No.: US 7,846,058 B2
(45) Date of Patent: Dec. 7, 2010

(54) POWER TRAIN OF AUTOMATIC TRANSMISSION

(75) Inventor: Woo Yeol Kim, Gunpo (KR)

(73) Assignee: Hyundai Motor Company, Seoul (KR)

( * ) Notice: Subject to any disclaimer, the term of this patent is extended or adjusted under 35 U.S.C. 154(b) by 528 days.

(21) Appl. No.: 11/943,263

(22) Filed: Nov. 20, 2007

(65) Prior Publication Data

US 2008/0312026 A1 Dec. 18, 2008

(30) Foreign Application Priority Data

Jun. 12, 1920 (KR) .................. 10-2007-0075337

(51) Int. Cl.
*F16H 3/44* (2006.01)
(52) U.S. Cl. .................................. 475/280
(58) Field of Classification Search ........... 475/269, 475/271–292, 313, 319, 325
See application file for complete search history.

(56) References Cited

U.S. PATENT DOCUMENTS

| | | | | |
|---|---|---|---|---|
| 7,008,346 B2 * | 3/2006 | Stevenson | ............... | 475/275 |
| 7,014,590 B2 * | 3/2006 | Stevenson | ............... | 475/284 |
| 7,452,303 B2 * | 11/2008 | Seo | ............... | 475/284 |
| 7,618,342 B2 * | 11/2009 | Kim | ............... | 475/287 |
| 7,727,103 B2 * | 6/2010 | Seo | ............... | 475/275 |
| 2005/0227806 A1 * | 10/2005 | Klemen et al. | ............... | 475/275 |
| 2008/0280721 A1 * | 11/2008 | Seo | ............... | 475/276 |

* cited by examiner

*Primary Examiner*—Roger Pang
(74) *Attorney, Agent, or Firm*—Morgan, Lewis & Bockius LLP

(57) ABSTRACT

A power train of an automatic transmission attains eight forward speeds and one reverse speed. The power train includes first, second, and third planetary gear sets, four clutches, and two brakes. The first planetary gear set generates a reduced rotational speed, the second planetary gear set generates a reverse rotational speed, and the third planetary gear set generates the eight forward speeds and the one reverse speed by using the reduced rotational speed, the reverse rotational speed, and a rotational speed of an input shaft.

36 Claims, 16 Drawing Sheets

FIG. 2

|     | C1 | C2 | C3 | C4 | B1 | B2 | F1 |
|-----|----|----|----|----|----|----|----|
| D1  | ●  |    |    |    | ○  |    | ●  |
| D2  | ●  |    |    |    |    | ●  |    |
| D3  | ●  |    |    | ●  |    |    |    |
| D4  | ●  |    | ●  |    |    |    |    |
| D5  |    |    | ●  | ●  |    |    |    |
| D6  |    | ●  | ●  |    |    |    |    |
| D7  |    |    | ●  |    |    | ●  |    |
| D8  |    |    | ●  |    | ●  |    |    |
| REV |    |    |    | ●  | ●  |    |    |

○ : operated at a low range

POWER TRAIN OF AUTOMATIC TRANSMISSION

CROSS-REFERENCE TO RELATED APPLICATION

This application claims priority to, and the benefit of, Korean Patent Application No. 10-2007-0057337, filed in the Korean Intellectual Property Office on Jun. 12, 2007, the entire contents of which are incorporated herein by reference.

BACKGROUND OF THE INVENTION (a) Field of the Invention

The present invention relates to an eight-speed power train of an automatic transmission.

(b) Description of the Related Art

A typical automatic transmission power train includes several planetary gear sets. The power train receives rotational speed and torque from a torque converter, changes the torque, and transmits the torque to an output shaft.

The larger the number of shift speeds, the better the fuel mileage and performance. A manual transmission that has too many speeds causes inconvenience to a driver. Therefore, power trains with large number of shift-speeds lend themselves best to automatic transmissions.

Durability, efficiency in power transmission, and size of the power train depend a lot on the layout of the planetary gear sets.

The above information disclosed in this Background section is only for enhancement of understanding of the background of the invention and therefore it may contain information that does not form the prior art that is already known in this country to a person of ordinary skill in the art.

SUMMARY OF THE INVENTION

A power train of an automatic transmission according to exemplary embodiments of the present invention includes an input shaft, an output gear, a transmission case, a first planetary gear set, a second planetary gear set, a third planetary gear set, and a plurality of friction members. The first planetary gear set includes a first operating member fixed to the transmission case, a second operating member receiving torque from the input shaft, and a third operating member outputting a reduced rotational speed by operations of the first and second operating members. The second planetary gear set includes a fourth operating member fixedly connected to the third operating member and receiving the reduced rotational speed therefrom, a fifth operating member selectively connected to the transmission case, and a sixth operating member selectively connected to the transmission case or outputting a reverse rotational speed by operations of the fourth and fifth operating members. Two of the fourth, fifth, and sixth operating members are selectively connected to each other. The third planetary gear set includes a seventh operating member fixedly connected to the sixth operating member and receiving the reverse rotational speed therefrom or selectively connected to the transmission case, an eighth operating member selectively connected to the fourth operating member, a ninth operating member selectively receiving the torque from the input shaft by being selectively connected thereto, and a tenth operating member outputting eight forward speeds and one reverse speed to the output gear by operations of the seventh, eighth, ninth, and tenth operating members. Two of the seventh, eighth, ninth, and tenth operating members are selectively connected to each other. The plurality of friction members selectively connects the operating members of the first, second, and third planetary gear sets to the input shaft, to other operating members, or to the transmission case.

The friction members may include a first clutch, a second clutch, a third clutch, a fourth clutch, a first brake, and a second brake. The first clutch selectively connects the fourth operating member to the eighth operating member, and the second clutch selectively connects two of the fourth, fifth, and sixth operating members with each other. The third clutch selectively connects the ninth operating member to the input shaft, and the fourth clutch selectively connects two of the seventh, eighth, ninth, and tenth operating members to each other. The first brake selectively connects the fifth operating member to the transmission case, and the second brake selectively connects the sixth operating member to the transmission case.

A one-way clutch, in parallel with the first brake, may be provided between the fifth operating member and the transmission case.

The first planetary gear set may be a single pinion planetary gear set and may have a first sun gear, a first planet carrier, and a first ring gear. The first sun gear is the first operating member, the first ring gear is the second operating member, and the first planet carrier is the third operating member.

According to the first to fourth exemplary embodiments of the present invention, the second planetary gear set may be a double pinion planetary gear set and may have a second sun gear, a second planet carrier, and a second ring gear. The second sun gear is the fourth operating member, the second ring gear is the fifth operating member, and the second planet carrier is the sixth operating member.

The third planetary gear set may be a compound planetary gear set and may have a third sun gear, a fourth sun gear, a third planet carrier, and a third ring gear. The third sun gear is the seventh operating member, the fourth sun gear is the eighth operating member, the third planet carrier is the ninth operating member, and the third ring gear is the tenth operating member.

According to the first exemplary embodiment of the present invention, the fifth operating member and the sixth operating member are selectively connected with each other by the second clutch.

The second and fourth clutches and the second brake may be disposed between the second planetary gear set and the third planetary gear set.

The first and third clutches may be disposed on the opposite side of the third planetary gear set than the second planetary gear set is.

According to the second exemplary embodiment of the present invention, the fourth operating member and the fifth operating member are selectively connected with each other by the second clutch.

The second brake and the fourth clutch may be disposed between the second planetary gear set and the third planetary gear set.

The second clutch may be disposed between the first planetary gear set and the second planetary gear set.

The first and third clutches may be disposed on the opposite side of the third planetary gear set than the second planetary gear set is.

According to the third and fourth exemplary embodiments of the present invention, the fourth operating member and the sixth operating member are selectively connected with each other by the second clutch.

The second brake and the fourth clutch may be disposed between the second planetary gear set and the third planetary gear set.

The first and third clutches may be disposed on the opposite side of the third planetary gear set than the second planetary gear set is.

According to the third exemplary embodiment of the present invention, the second clutch is disposed between the first planetary gear set and the second planetary gear set.

According to the fourth exemplary embodiment of the present invention, the second clutch is disposed between the second planetary gear set and the third planetary gear set.

According to the fifth to ninth exemplary embodiments of the present invention, the second planetary gear set is a single pinion planetary gear set and has a second sun gear, a second planet carrier, and a second ring gear. The second sun gear is the fourth operating member, the second planet carrier is the fifth operating member, and the second ring gear is the sixth operating member.

The third planetary gear set may be a compound planetary gear set and may have a third sun gear, a fourth sun gear, a third planet carrier, and a third ring gear. The third sun gear is the seventh operating member, the fourth sun gear is the eighth operating member, the third planet carrier is the ninth operating member, and the third ring gear is the tenth operating member.

According to the fifth exemplary embodiment of the present invention, the fourth operating member and the sixth operating member are selectively connected with each other by the second clutch.

The first brake and the one-way clutch may be disposed between the first planetary gear set and the second planetary gear set.

The second and fourth clutches and the second brake may be disposed between the second planetary gear set and the third planetary gear set.

The first and third clutches may be disposed on the opposite side of the third planetary gear set than the second planetary gear set is.

According to the sixth and seventh exemplary embodiments of the present invention, the fifth operating member and the sixth operating member are selectively connected with each other by the second clutch.

The first brake and the one-way clutch may be disposed between the first planetary gear set and the second planetary gear set.

The fourth clutch and the second brake may be disposed between the second planetary gear set and the third planetary gear set.

The first and third clutches may be disposed on the opposite side of the third planetary gear set than the second planetary gear set is.

According to the sixth exemplary embodiment of the present invention, the second clutch is disposed between the second planetary gear set and the third planetary gear set.

According to the seventh exemplary embodiment of the present invention, the second clutch is disposed between the first planetary gear set and the second planetary gear set.

According to the eighth and ninth exemplary embodiments of the present invention, the fourth operating member and the fifth operating member are selectively connected with each other by the second clutch.

The first brake and the one-way clutch may be disposed between the first planetary gear set and the second planetary gear set.

The fourth clutch and the second brake may be disposed between the second planetary gear set and the third planetary gear set.

The first and third clutches may be disposed on the opposite side of the third planetary gear set than the second planetary gear set is.

According to the eighth exemplary embodiment of the present invention, the second clutch is disposed between the second planetary gear set and the third planetary gear set.

According to the ninth exemplary embodiment of the present invention, the second clutch is disposed between the first planetary gear set and the second planetary gear set.

BRIEF DESCRIPTION OF THE DRAWINGS

FIG. 2 is an operational chart for a power train of an automatic transmission according to exemplary embodiments of the present invention.

DETAILED DESCRIPTION OF PREFERRED EMBODIMENTS

Figure 1:
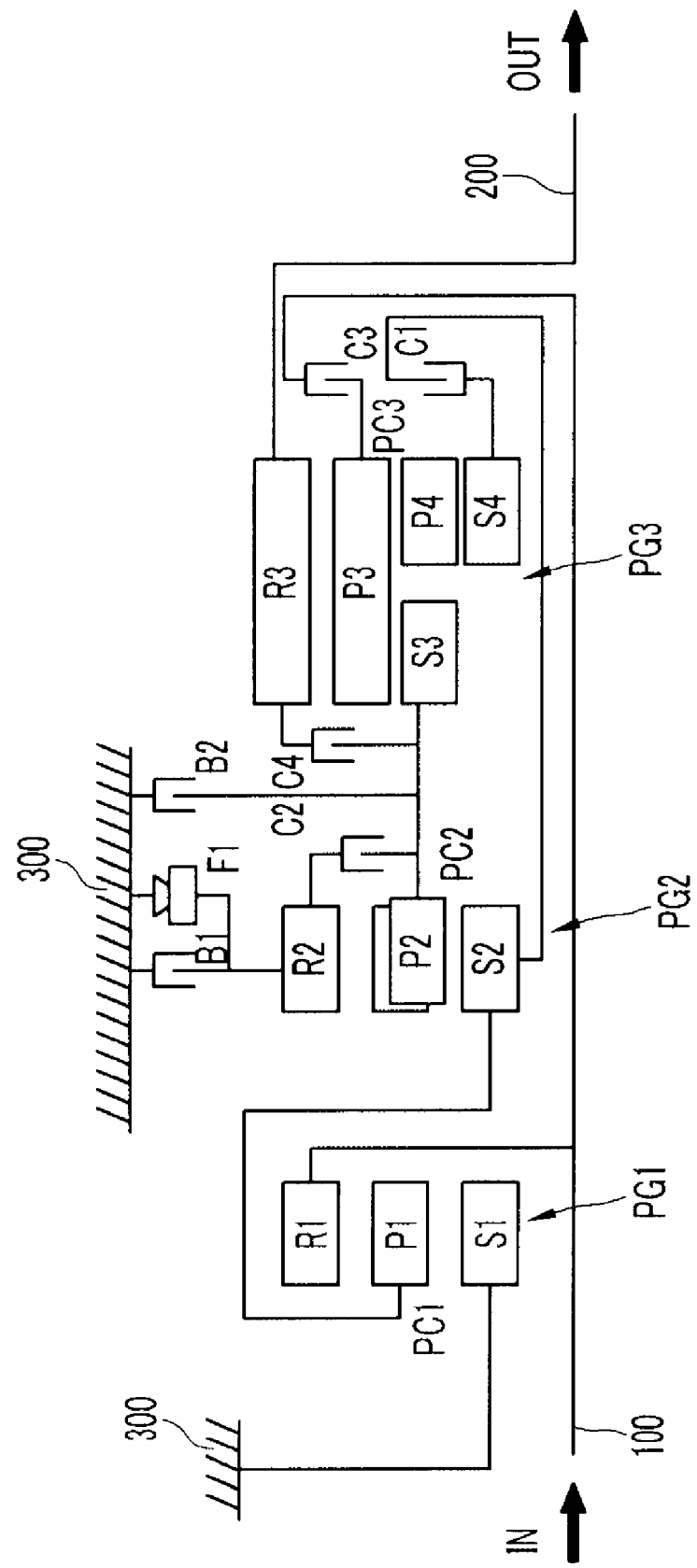
FIG. 1 is a schematic diagram of a power train of an automatic transmission according to a first exemplary embodiment of the present invention.

Exemplary embodiments of the present invention will hereinafter be described in detail with reference to the accompanying drawings.

As shown in FIG. 1 to FIG. 16, power trains of an automatic transmission according to exemplary embodiments of the present invention include an input shaft 100, which receives torque from an engine (not shown); an output gear 200, which transmits torque from the power train; a transmission case 300; first, second, and third planetary gear sets PG1, PG2, and PG3; and a plurality of friction members, such as clutches C1, C2, C3, C4, and brakes B1, and B2.

The first planetary gear set PG1, which includes first, second, and third operating members, receives the torque from the input shaft 100, and transmits a reduced rotational speed to the second planetary gear set PG2 by operating the first, second, and third operating members. The first operating member is fixed to the transmission case 300 and is always stopped. The second operating member is fixedly connected to the input shaft 100 and rotates with the same speed as the input shaft 100. The third operating member generates the reduced rotational speed by operations of the first and second operating members.

The second planetary gear set PG2, which includes fourth, fifth, and sixth operating members, transmits the reduced rotational speed, received from the first planetary gear set PG1, to the third planetary gear set PG3, or transmits a reverse rotational speed to the third planetary gear set PG3, by operating the fourth, fifth, and sixth operating members. The fourth operating member is fixedly connected to the third operating member, and transmits the reduced rotational speed therefrom. The fifth operating member is selectively connected to the transmission case 300, and is selectively stopped. The sixth operating member generates the reverse rotational speed by operations of the fourth and fifth operating members. In addition, two of the fourth, fifth, and sixth operating members are selectively connected to each other.

The third planetary gear set PG3, which includes seventh, eighth, ninth, and tenth operating members, receives the reverse rotational speed, or the reduced rotational speed, from the second planetary gear set PG2, or receives the rotational speed of the input shaft 100. The third planetary gear set PG3 generates eight forward speeds and one reverse speed. The seventh operating member is selectively connected to the sixth operating member, and receives the reverse rotational speed therefrom, or is selectively connected to the transmission case 300 and is stopped. The eighth operating member is selectively connected to the fourth operating member, and receives the reduced rotational speed. The ninth operating member is selectively connected to the input shaft 100. The tenth operating member is fixedly connected to the output gear 200, and transmits the eight forward speeds and the one reverse speed to the output gear 200 by operating the seventh, eighth, and ninth operating members. In addition, two of the seventh, eighth, ninth, and tenth operating members are selectively connected to each other.

The friction members connect operating members of the first, second, and third planetary gear sets PG1, PG2, and PG3 to the input shaft 100, to other operating members, or to the transmission case 300. The friction members include first, second, third, and fourth clutches C1, C2, C3, and C4 and first and second brakes B1 and B2. The first clutch C1 selectively couples the fourth operating member with the eighth operating member so as to selectively transmit the reduced rotational speed of the fourth operating member to the eighth operating member. The second clutch C2 selectively couples two of the fourth, fifth, and sixth operating members with each other. The third clutch C3 selectively couples the ninth operating member to the input shaft 100 so as to selectively transmit the rotational speed of the input shaft 100 to the ninth operating member. The fourth clutch C4 selectively couples two of the seventh, eighth, ninth, and tenth operating members to each other. The first brake B1 selectively couples the fifth operating member to the transmission case 300 and stops the fifth operating member. The second brake B2 selectively couples the sixth operating member to the transmission case 300 and stops the sixth operating member. In addition, a one-way clutch F1, disposed in parallel with the first brake B1, is disposed between the fifth operating member and the transmission case 300.

Referring to FIG. 1, the power train of an automatic transmission according to a first exemplary embodiment of the present invention will be described in detail.

As shown in FIG. 1, the power train of an automatic transmission according to the first exemplary embodiment of the present invention includes the first, second, and third planetary gear sets PG1, PG2, and PG3.

The first planetary gear set PG1 is a single pinion planetary gear set, and has a first sun gear S1, a first planet carrier PC1, and a first ring gear R1 as operational members thereof. A first pinion gear P1, engaged with the first ring gear R1 and the first sun gear S1, is connected to the first planet carrier PC1. In addition, the first sun gear S1 is operated as the first operating member, the first ring gear R1 is operated as the second operating member, and the first planet carrier PC1 is operated as the third operating member.

The second planetary gear set PG2 is a double pinion planetary gear set, and has a second sun gear S2, a second planet carrier PC2, and a second ring gear R2 as operational members thereof. A second pinion gear P2, engaged with the second ring gear R2 and the second sun gear S2, is connected to the second planet carrier PC2. In addition, the second sun gear S2 is operated as the fourth operating member, the second ring gear R2 is operated as the fifth operating member, and the second planet carrier PC2 is operated as the sixth operating member.

The third planetary gear set PG3 is a compound planetary gear set, and has a third sun gear S3, a fourth sun gear S4, a third planet carrier PC3, and a third ring gear R3 as operational members thereof. A third pinion gear P3, engaged with the third sun gear S3 and the third ring gear R3, and a fourth pinion gear P4, engaged with the fourth sun gear S4 and the third ring gear R3, are connected to the third planet carrier PC3. In addition, the third sun gear S3 is operated as the seventh operating member, the fourth sun gear S4 is operated as the eighth operating member, the third planet carrier PC3 is operated as the ninth operating member, and the third ring gear R3 is operated as the tenth operating member.

According to the first exemplary embodiment of the present invention, the fifth operating member and the sixth operating member are selectively connected with each other by the second clutch C2.

The second and fourth clutches C2 and C4 and the second brake B2 are disposed between the second planetary gear set PG2 and the third planetary gear set PG3, and the first and third clutches C1 and C3 are disposed on the opposite side of the third planetary gear set PG3.

In addition, the first, second, and third planetary gear sets PG1, PG2, and PG3 are disposed in a sequence of the first planetary gear set PG1, the second planetary gear set PG2, and the third planetary gear set PG3.

Hereinafter, operations of the power train of an automatic transmission according to the first exemplary embodiment of the present invention will be described.

As shown in FIG. 2, according to the first exemplary embodiment of the present invention, the first clutch C1 and the one-way clutch F1 are applied in a first forward speed D1, the first clutch C1 and the second brake B2 are applied in a second forward speed, the first and fourth clutches C1 and C4 are applied in a third forward speed, the first and third clutches C1 and C3 are applied in a fourth forward speed, the third and fourth clutches C3 and C4 are applied in a fifth forward speed, the second and third clutches C2 and C3 are applied in a sixth forward speed, the third clutch C3 and the second brake B2 are applied in a seventh forward speed, and the third clutch C3 and the first brake B1 are applied in an eighth forward speed. In addition, the fourth clutch C4 and the first brake B1 are applied in a reverse speed REV.

Hereinafter, formation of the eight forward speeds and the one reverse speed in the power train of an automatic transmission according to the first exemplary embodiment of the present invention will be described in detail.

Figure 3:
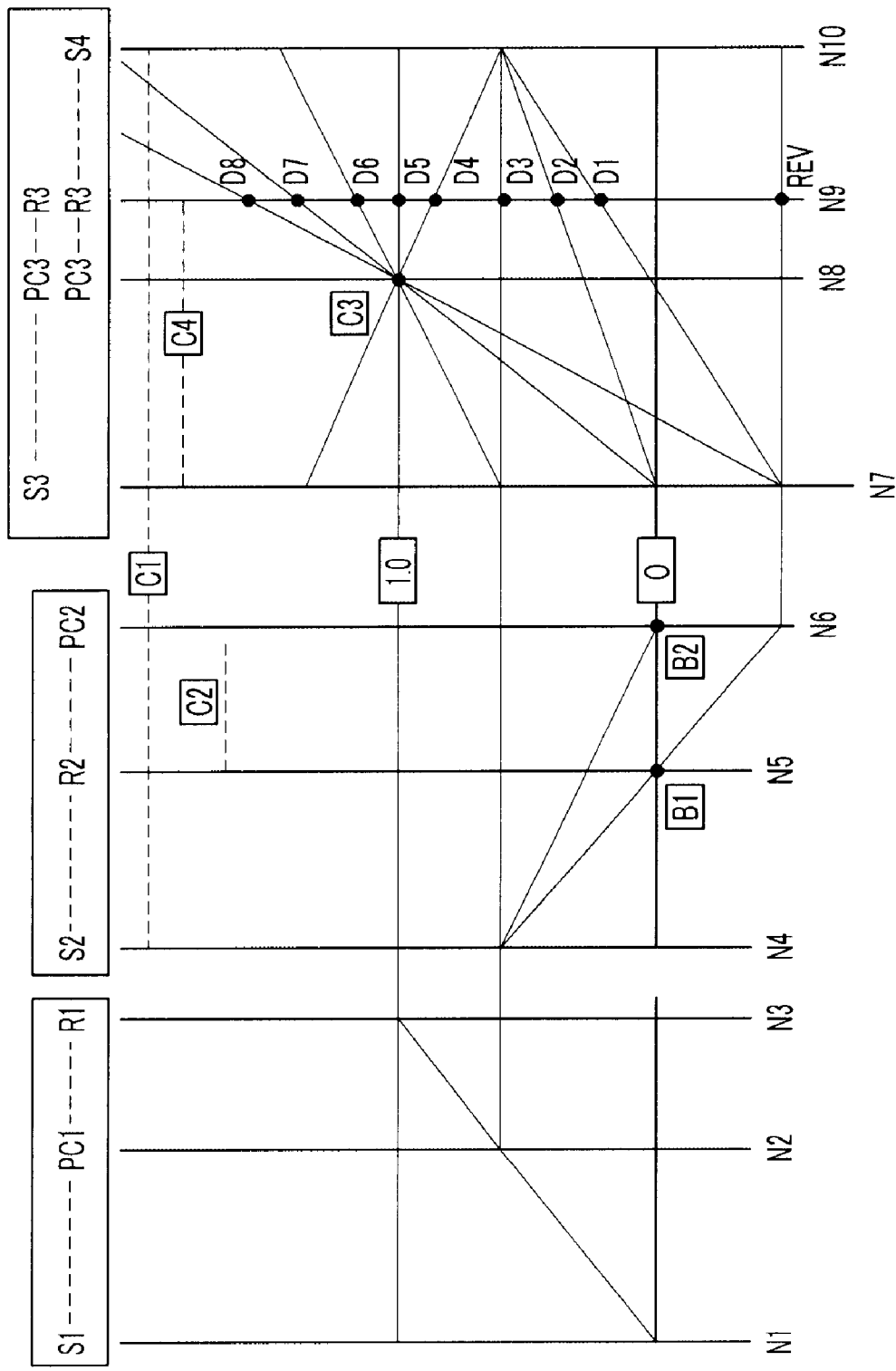
FIG. 3 is a lever diagram showing shifting processes from a first forward speed to an eighth forward speed and one reverse speed in a power train of an automatic transmission according to the first exemplary embodiment of the present invention.

As shown in FIG. 3, the power train of an automatic transmission according to the first exemplary embodiment of the present invention includes one single pinion planetary gear set PG1, one double pinion planetary gear set PG2, and one compound planetary gear set PG3. Therefore, operational members of the power train according to the first exemplary embodiment of the present invention are represented as ten nodes in the lever diagram.

Accordingly, the first sun gear S1 is set as a first node N1, the first planet carrier PC1 is set as a second node N2, the first ring gear R1 is set as a third node N3, the second sun gear S2 is set as a fourth node N4, the second ring gear R2 is set as a fifth node N5, the second planet carrier PC2 is set as a sixth node N6, the third sun gear S3 is set as a seventh node N7, the third planet carrier PC3 is set as an eighth node N8, the third ring gear R3 is set as a ninth node N9, and the fourth sun gear S4 is set as a tenth node N10.

As described above, the first sun gear S1 is fixed to the transmission case 300, and thus the first node N1 is always stopped. In addition, the first ring gear R1 is fixedly connected to the input shaft 100, and thus the third node N3 rotates with the same rotational speed as the input shaft 100. Therefore, the second node N2 of the first planet carrier PC1 rotates with a reduced rotational speed.

In addition, the second sun gear S2 is always connected to the first planet carrier PC1, and thus the fourth node N4 of the second sun gear S2 always rotates with the reduced rotational speed.

The second ring gear R2 is selectively connected to the transmission case 300 by the first brake B1 or the one-way clutch F1, and thus the fifth node N5 is selectively stopped by an operation of the first brake B1 or the one-way clutch F1. In this case, the reverse rotational speed, which rotates in a direction opposite the rotating direction of the input shaft 100, is generated at the sixth node N6 of the second planet carrier PC2 by operations of the second sun gear S2 and the second ring gear R2.

The second planet carrier PC2 is selectively connected to the second ring gear R2 by the second clutch C2. Therefore, when the second clutch C2 is operated, all operating members of the second planetary gear set PG2 rotate with the reduced rotational speed. In addition, the second planet carrier PC2 is selectively connected to the transmission case 300 by the second brake B2, and thus the sixth node N6 is selectively stopped by an operation of the second brake B2.

The seventh node N7 of the third sun gear S3 is always connected to the second planet carrier PC2, and receives the reduced rotational speed or the reverse rotational speed from the second planet carrier PC2, or is selectively stopped by the operation of the second brake B2.

The third planet carrier PC3 is selectively connected to the input shaft 100 by the third clutch C3, and thus the eighth node N8 of the third planet carrier PC3 rotates with the same rotational speed as the input shaft 100 by operation of the third clutch 3.

The third ring gear R3 is selectively connected to the third sun gear S3 by the fourth clutch C4. In addition, the ninth node N9 of the third ring gear R3 is fixedly connected to the output gear 200 and operates as an output member.

The tenth node N10 of the fourth sun gear S4 is selectively connected to the second sun gear S2 by the first clutch C1, and thus the tenth node N10 receives the reduced rotational speed by an operation of the first clutch C1.

Hereinafter, processes for attaining the shift speeds in the power train of an automatic transmission according to the first exemplary embodiment of the present invention will be described in detail, referring to FIG. 3.

In the first forward speed D1, the tenth node N10 rotates with the reduced rotational speed by the operation of the first clutch C1. In addition, the reverse rotational speed is generated at the sixth node N6 by the operation of the one-way clutch F1 and the reverse rotational speed is transmitted to the seventh node N7. Therefore, the first forward speed D1 is achieved at the ninth node N9.

In the second forward speed D2, the tenth node N10 rotates with the reduced rotational speed by the operation of the first clutch C1. In addition, the seventh node N7 is stopped by the operation of the second brake B2. Therefore, the second forward speed D2 is achieved at the ninth node N9.

In the third forward speed D3, the tenth node N10 rotates with the reduced rotational speed by the operation of the first clutch C1. In addition, all operating members of the third planetary gear set PG3 rotate with the same rotational speed by the operation of the fourth clutch C4. Therefore, the third forward speed D3 is achieved at the ninth node N9.

In the fourth forward speed D4, the tenth node N10 rotates with the reduced rotational speed by the operation of the first clutch C1. In addition, the eighth node N8 rotates with the same rotational speed as the input shaft 100 by the operation of the third clutch C3. Therefore, the fourth forward speed D4 is achieved at the ninth node N9.

In the fifth forward speed D5, the eighth node N8 rotates with the same rotational speed as the input shaft 100 by the operation of the third clutch C3. In addition, all operating members of the third planetary gear set PG3 rotate with the same rotational speed by the operation of the fourth clutch C4. Therefore, the fifth forward speed D5 is achieved at the ninth node N9.

In the sixth forward speed D6, all operating members of the second planetary gear set PG2 rotate with the reduced rotational speed by the operation of the second clutch C2, and thus the seventh node N7 rotates with the reduced rotational speed. In addition, the eighth node N8 rotates with the same rotational speed as the input shaft 100 by the operation of the third clutch C3. Therefore, the sixth forward speed D6 is achieved at the ninth node N9.

In the seventh forward speed D7, the eighth node N8 rotates with the same rotational speed as the input shaft 100 by the operation of the third clutch C3. In addition, the seventh node N7 is stopped by the operation of the second brake B2. Therefore, the seventh forward speed D7 is achieved at the ninth node N9.

In the eighth forward speed D8, the eighth node N8 rotates with the same rotational speed as the input shaft 100 by the operation of the third clutch C3. In addition, the reverse rotational speed is generated at the sixth node N6 by the operation of the first brake B1, and the reverse rotational speed is transmitted to the seventh node N7. Therefore, the eighth forward speed D8 is achieved at the ninth node N9.

In the reverse speed REV, the reverse rotational speed is generated at the sixth node N6 by the operation of the first brake B1, and the reverse rotational speed is transmitted to the seventh node N7. In addition, all operating members of the third planetary gear set PG3 rotate with the same rotational speed by the operation of the fourth clutch C4. Therefore, the reverse speed REV is achieved at the ninth node N9.

Hereinafter, referring to FIG. 4, the power train of an automatic transmission according to the second exemplary embodiment of the present invention will be described.

Figure 4:
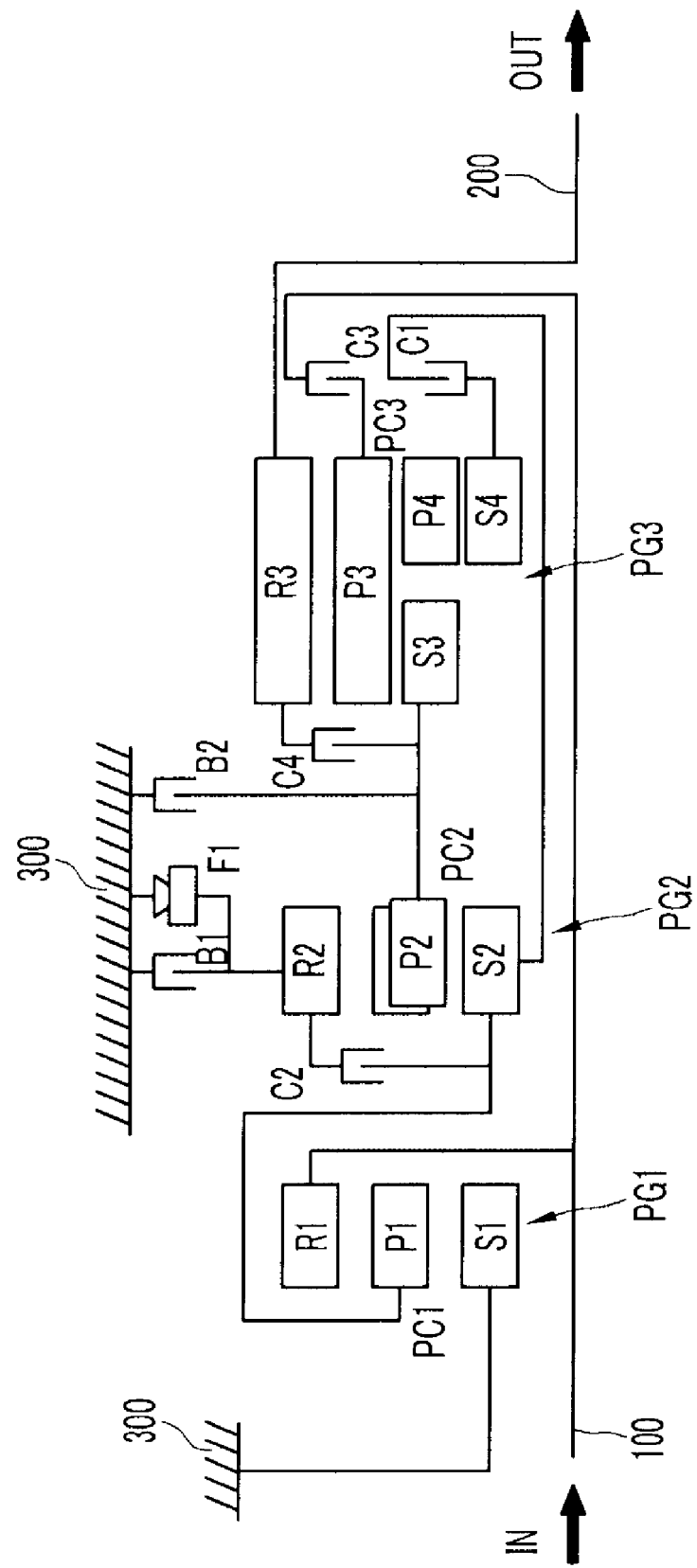
FIG. 4 is a schematic diagram of a power train of an automatic transmission according to a second exemplary embodiment of the present invention.
Figure 5:
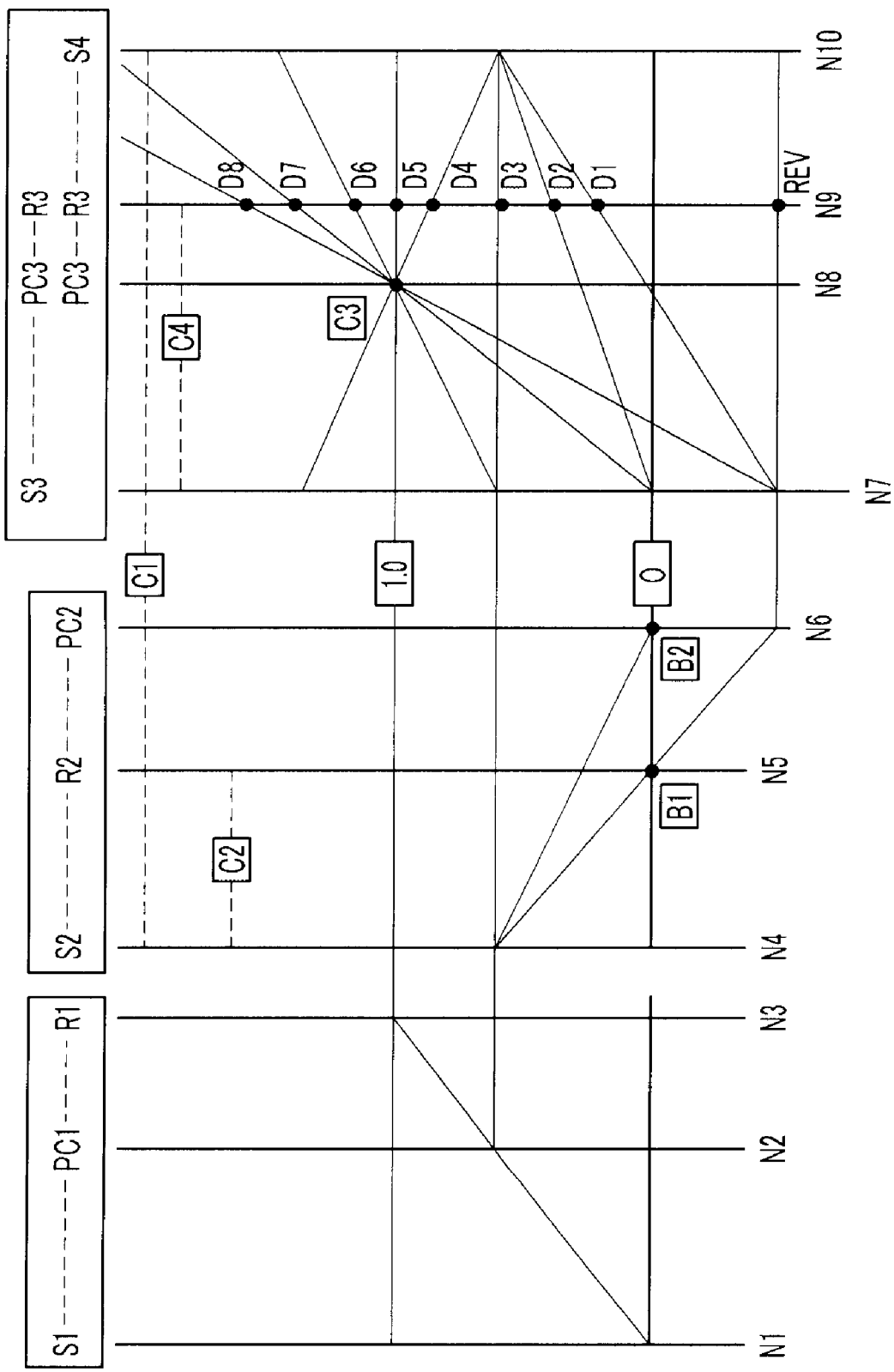
FIG. 5 is a lever diagram showing shifting processes from a first forward speed to an eighth forward speed and one reverse speed in a power train of an automatic transmission according to the second exemplary embodiment of the present invention.

As shown in FIG. 4, the power train of an automatic transmission according to the second exemplary embodiment of the present invention is similar to the power train of an automatic transmission according to the first exemplary embodiment of the present invention except for the operating members connected by the second clutch C2 and the position of the second clutch C2. A detailed description of the components that are identical to those of the first embodiment will be omitted.

According to the second exemplary embodiment of the present invention, the second clutch C2 selectively connects the fourth operating member to the fifth operating member. In addition, the second clutch C2 is disposed between the first planetary gear set PG1 and the second planetary gear set PG2, the fourth clutch C4 and the second brake B2 are disposed between the second planetary gear set PG2 and the third planetary gear set PG3, and the first and third clutches C1 and C3 are disposed on the opposite side of the third planetary gear set PG3.

Hereinafter, referring to FIG. 6 and FIG. 7, the power trains of an automatic transmission according to the third and fourth exemplary embodiments of the present invention will be described.

Figure 6:
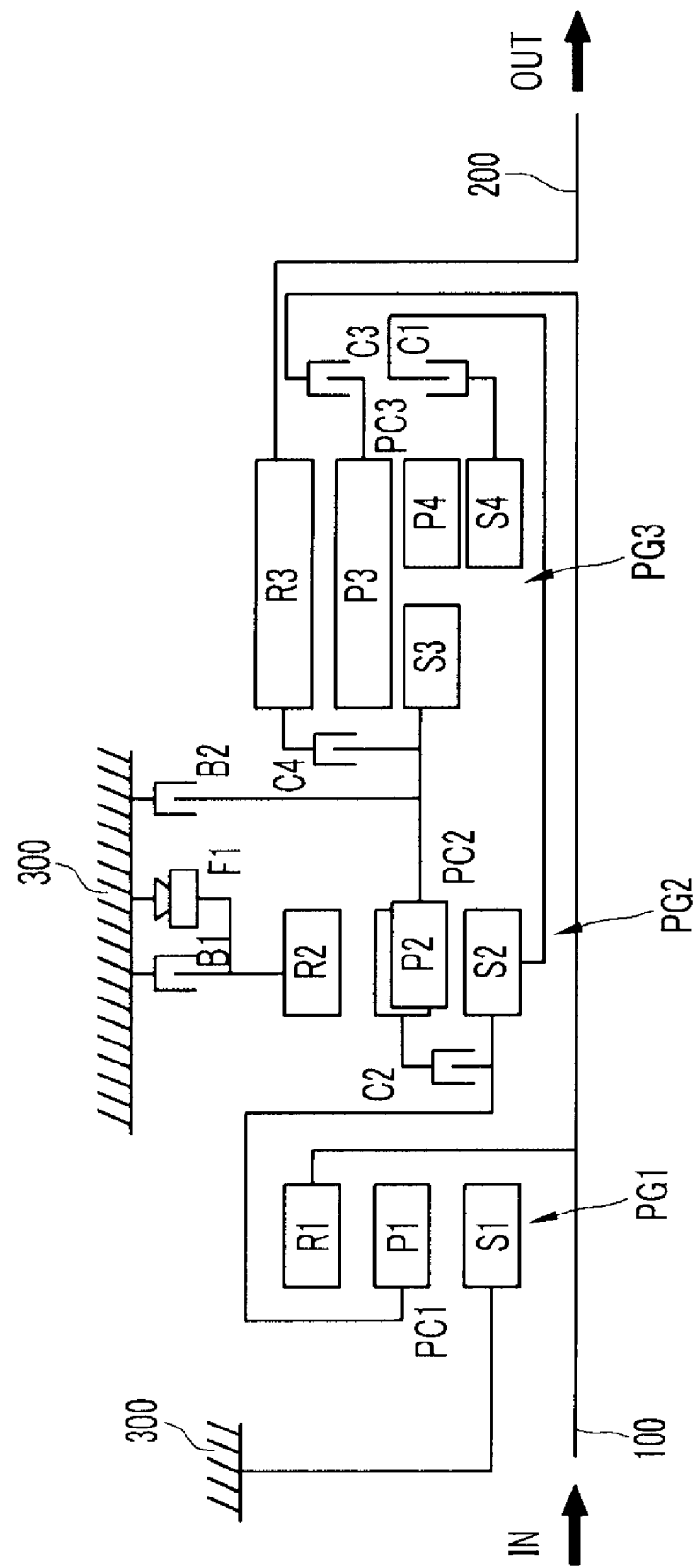
FIG. 6 is a schematic diagram of a power train of an automatic transmission according to a third exemplary embodiment of the present invention.
Figure 7:
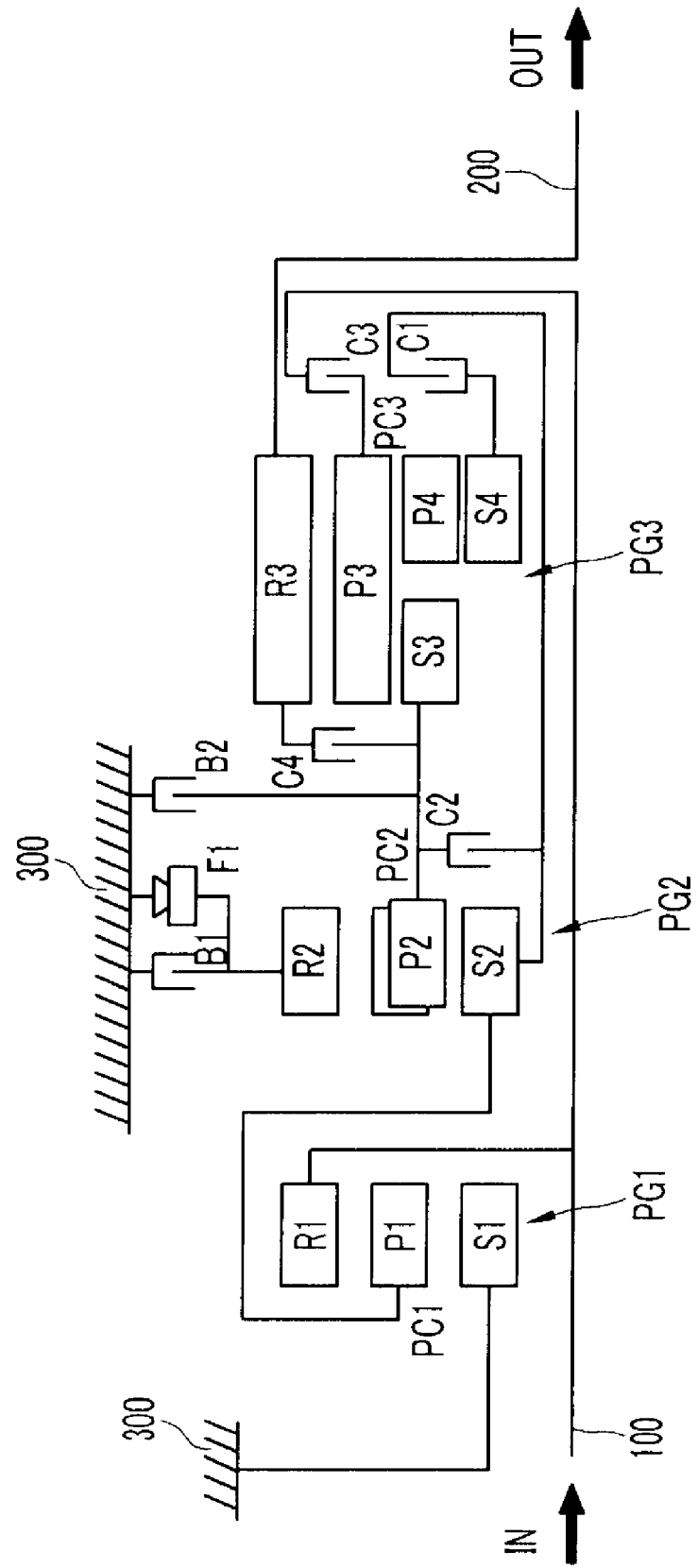
FIG. 7 is a schematic diagram of a power train of an automatic transmission according to a fourth exemplary embodiment of the present invention.
Figure 8:
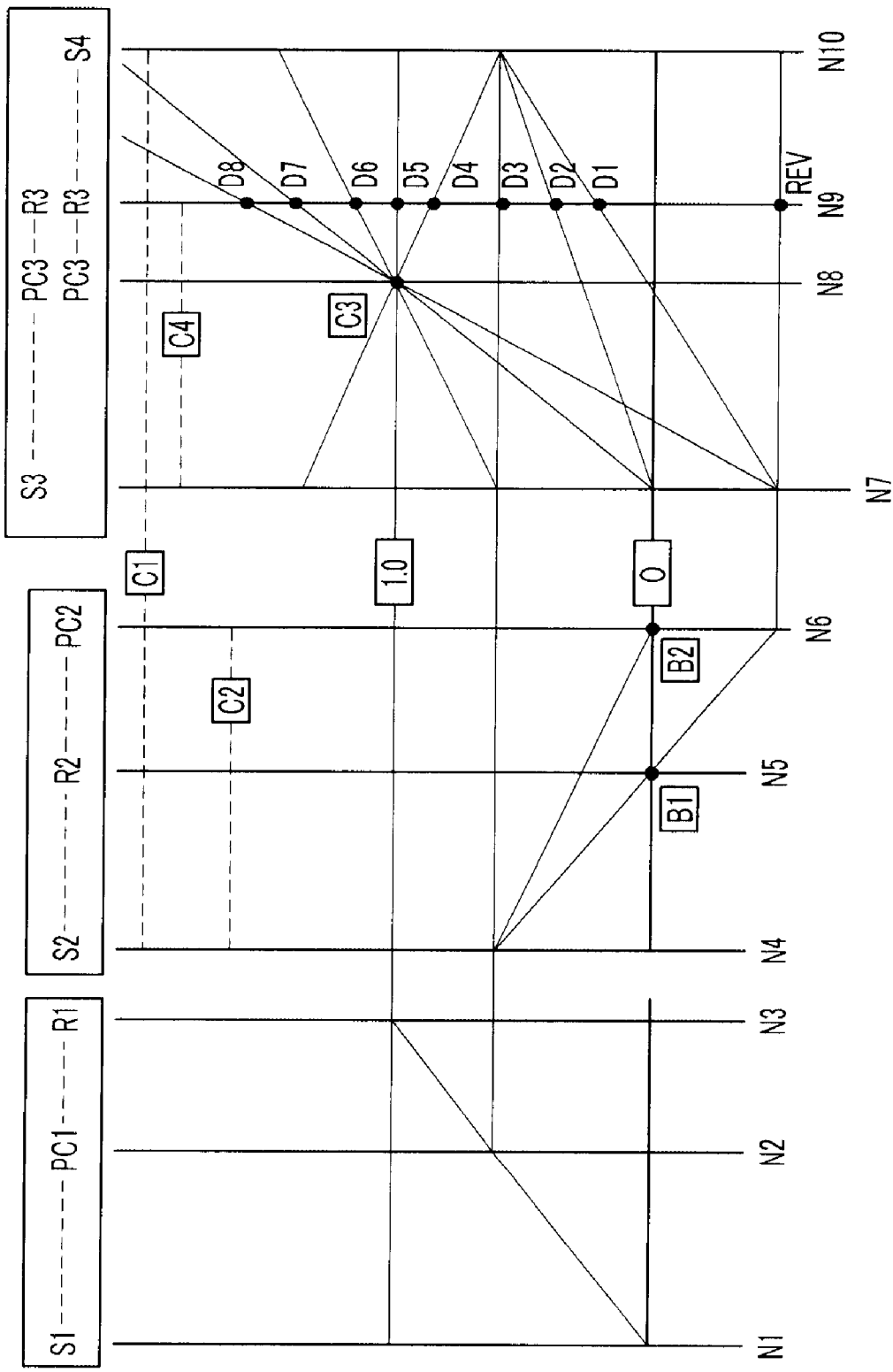
FIG. 8 is a lever diagram showing shifting processes from a first forward speed to an eighth forward speed and one reverse speed in a power train of an automatic transmission according to the third and fourth exemplary embodiments of the present invention.

As shown in FIG. 6 and FIG. 7, the power trains of an automatic transmission according to the third and fourth exemplary embodiments of the present invention are similar to the power train of an automatic transmission according to the first exemplary embodiment of the present invention except for the operating members connected by the second clutch C2 and the position of the second clutch C2. A detailed description of the components that are identical to those of the first embodiment will be omitted.

According to the third and fourth exemplary embodiments of the present invention, the second clutch C2 selectively connects the fourth operating member to the sixth operating member. In addition, the fourth clutch C4 and the second brake B2 are disposed between the second planetary gear set PG2 and the third planetary gear set PG3, and the first and third clutches C1 and C3 are disposed on the opposite side of the third planetary gear set PG3.

According to the third exemplary embodiment of the present invention, the second clutch C2 is disposed between the first planetary gear set PG1 and the second planetary gear set PG2, and according to the fourth exemplary embodiment of the present invention, the second clutch C2 is disposed between the second planetary gear set PG2 and the third planetary gear set PG3.

Hereinafter, referring to FIG. 9 to FIG. 16, the power trains of an automatic transmission according to the fifth to ninth exemplary embodiments of the present invention will be described.

As shown in FIG. 9 to FIG. 16, the power trains of an automatic transmission according to the fifth to ninth exemplary embodiments of the present invention are similar to the power train of an automatic transmission according to the first exemplary embodiment of the present invention, except that the second planetary gear set PG2 is a single pinion planetary gear set. A detailed description of the components that are identical to those of the first embodiment will be omitted.

Figure 9:
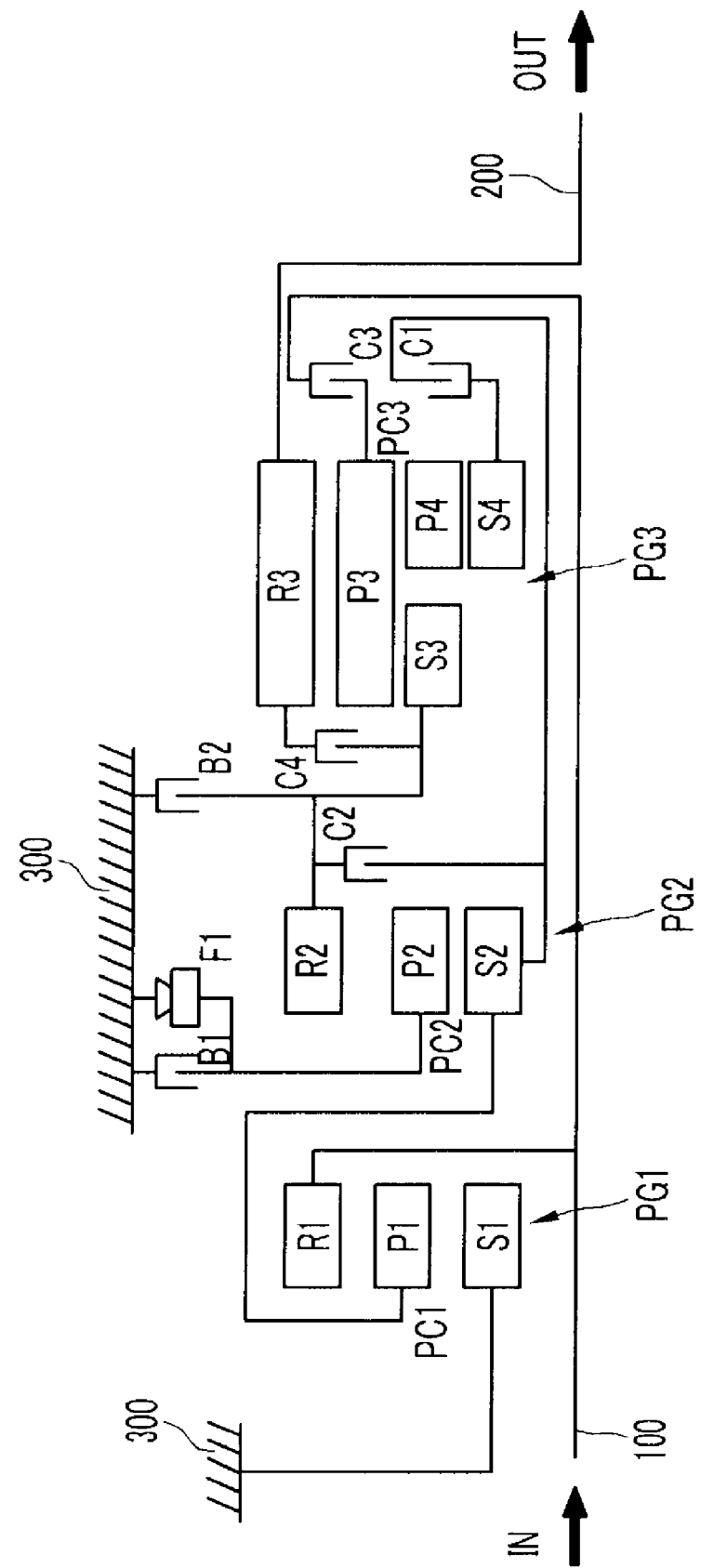
FIG. 9 is a schematic diagram of a power train of an automatic transmission according to a fifth exemplary embodiment of the present invention.
Figure 10:
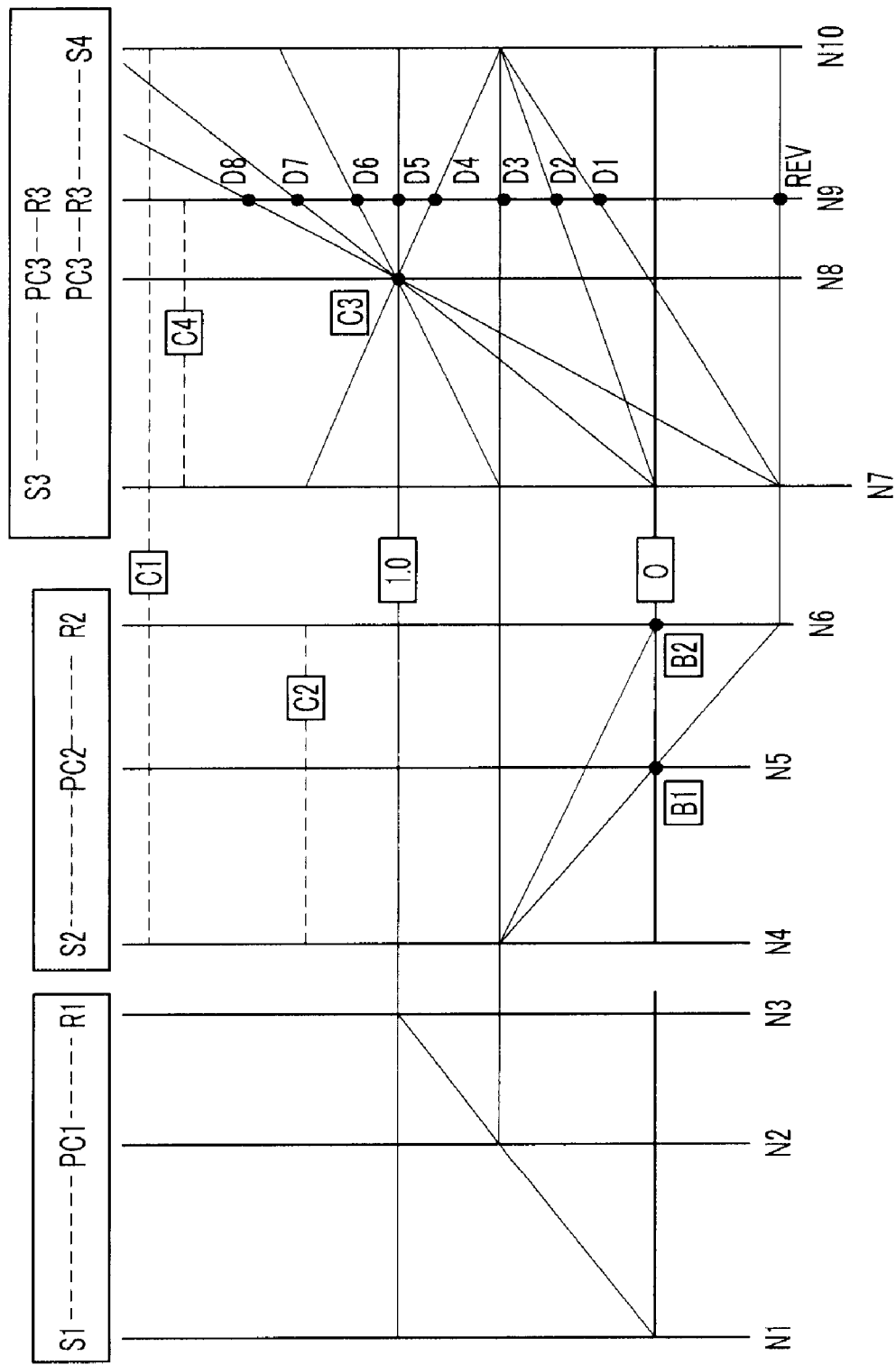
FIG. 10 is a lever diagram showing shifting processes from a first forward speed to an eighth forward speed and one reverse speed in a power train of an automatic transmission according to the fifth exemplary embodiment of the present invention.

As shown in FIG. 9, the power train of an automatic transmission according to the fifth exemplary embodiment of the present invention includes first, second, and third planetary gear sets PG1, PG2, and PG3.

The first planetary gear set PG1 is a single pinion planetary gear set, and has a first sun gear S1, a first planet carrier PC1, and a first ring gear R1 as operational members thereof. In addition, the first sun gear S1 is operated as the first operating member, the first ring gear R1 is operated as the second operating member, and the first planet carrier PC1 is operated as the third operating member.

The second planetary gear set PG2 is a single pinion planetary gear set, and has a second sun gear S2, a second planet carrier PC2, and a second ring gear R2 as operational members thereof. In addition, the second sun gear S2 is operated as the fourth operating member, the second planet carrier PC2 is operated as the fifth operating member, and the second ring gear R2 is operated as the sixth operating member.

The third planetary gear set PG3 is a compound planetary gear set, and has a third sun gear S3, a fourth sun gear S4, a third planet carrier PC3, and a third ring gear R3 as operational members thereof. In addition, the third sun gear S3 is operated as the seventh operating member, the fourth sun gear S4 is operated as the eighth operating member, the third planet carrier PC3 is operated as the ninth operating member, and the third ring gear R3 is operated as the tenth operating member.

In addition, according to the fifth exemplary embodiment of the present invention, the fourth operating member and the sixth operating member are selectively connected with each other by the second clutch C2.

The first brake B1 and the one-way clutch F1 are disposed between the first planetary gear set PG1 and the second planetary gear set PG2, the second and fourth clutches C2 and C4 and the second brake B2 are disposed between the second planetary gear set PG2 and the third planetary gear set PG3, and the first and third clutches C1 and C3 are disposed on the opposite side of the third planetary gear set PG3.

Operation, shifting processes, and formation of each speed of the power train according to the fifth exemplary embodiment of the present invention are similar to those of the power train according to the first embodiment of the present invention, and may be easily obtained by a person skilled in the art based on the teachings herein. Thus, a detailed explanation thereof will be omitted.

Hereinafter, referring to FIG. 11 and FIG. 12, the power trains of an automatic transmission according to the sixth and seventh exemplary embodiments of the present invention will be described.

Figure 11:
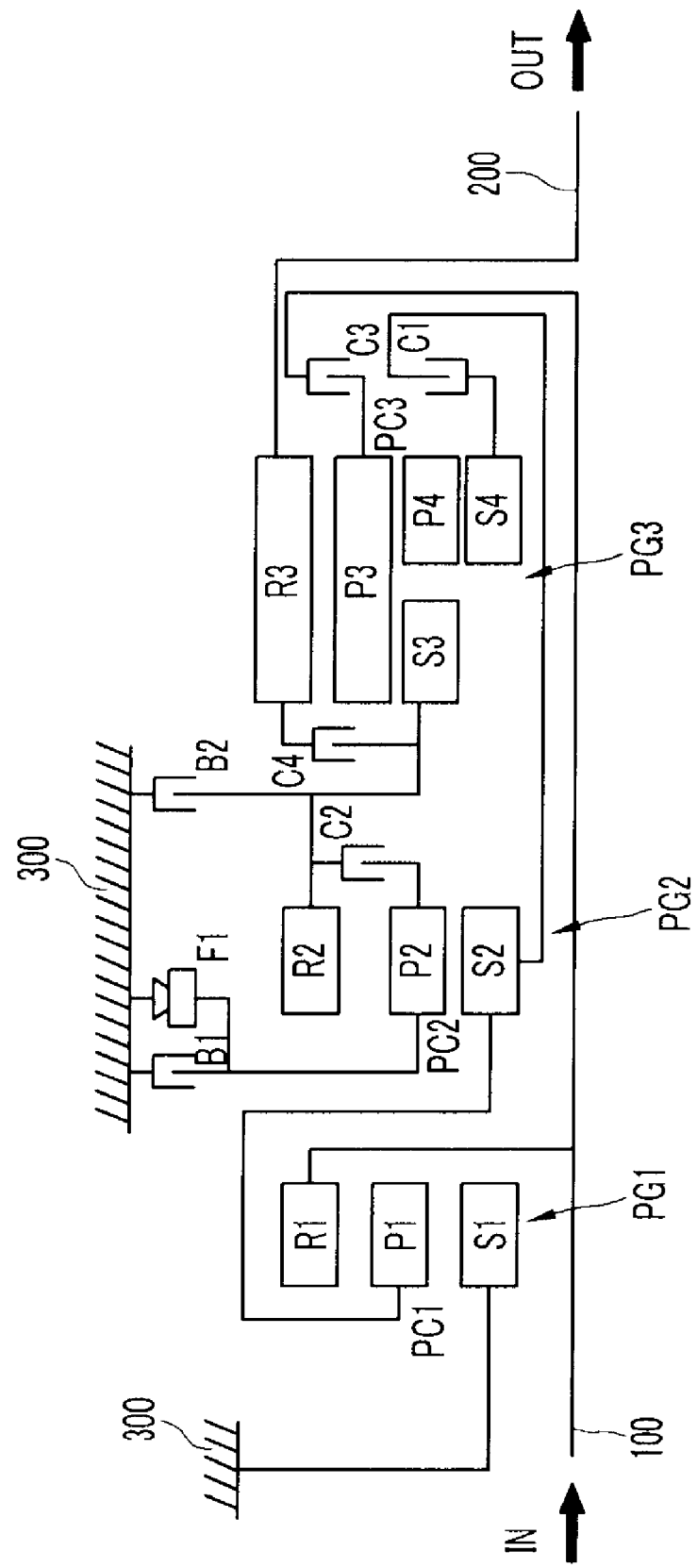
FIG. 11 is a schematic diagram of a power train of an automatic transmission according to a sixth exemplary embodiment of the present invention.
Figure 12:
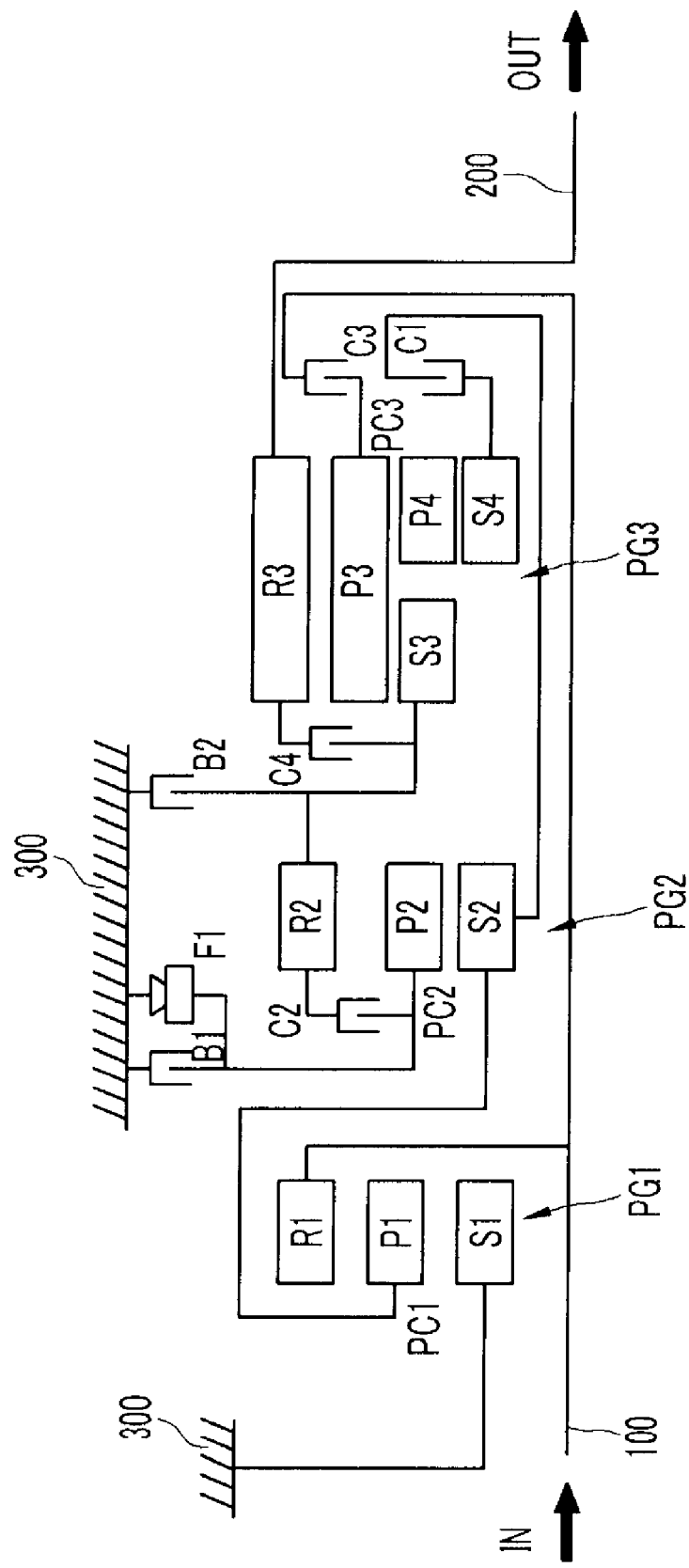
FIG. 12 is a schematic diagram of a power train of an automatic transmission according to a seventh exemplary embodiment of the present invention.
Figure 13:
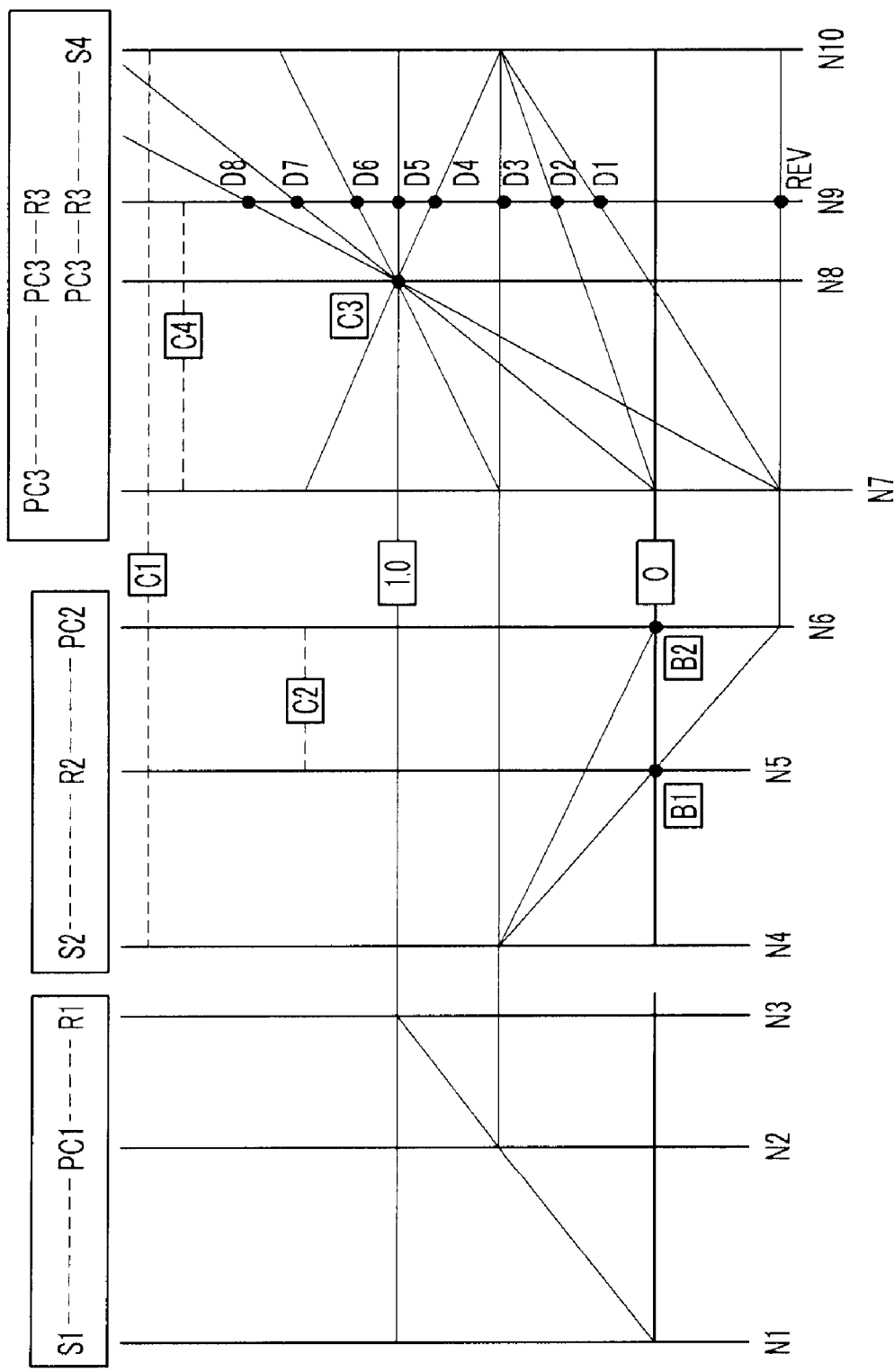
FIG. 13 is a lever diagram showing shifting processes from a first forward speed to an eighth forward speed and one reverse speed in a power train of an automatic transmission according to the sixth and seventh exemplary embodiments of the present invention.

As shown in FIG. 11 and FIG. 12, the power trains of an automatic transmission according to the sixth and seventh exemplary embodiments of the present invention are similar to the power train of an automatic transmission according to the fifth exemplary embodiment of the present invention except for the operating members connected by the second clutch C2 and the position of the second clutch C2. A detailed description of the components that are identical to those of the fifth embodiment will be omitted.

According to the sixth and seventh exemplary embodiments of the present invention, the second clutch C2 selectively connects the fifth operating member to the sixth operating member. In addition, the first brake B1 and the one-way clutch F1 are disposed between the first planetary gear set PG1 and the second planetary gear set PG2, the fourth clutch C4 and the second brake B2 are disposed between the second planetary gear set PG2 and the third planetary gear set PG3, and the first and third clutches C1 and C3 are disposed on the opposite side of the third planetary gear set PG3.

According to the sixth exemplary embodiment of the present invention, the second clutch C2 is disposed between the second planetary gear set PG2 and the third planetary gear set PG3, and according to the seventh exemplary embodiment of the present invention, the second clutch C2 is disposed between the first planetary gear set PG1 and the second planetary gear set PG2.

Hereinafter, referring to FIG. 14 and FIG. 15, the power trains of an automatic transmission according to the eighth and ninth exemplary embodiments of the present invention will be described.

Figure 14:
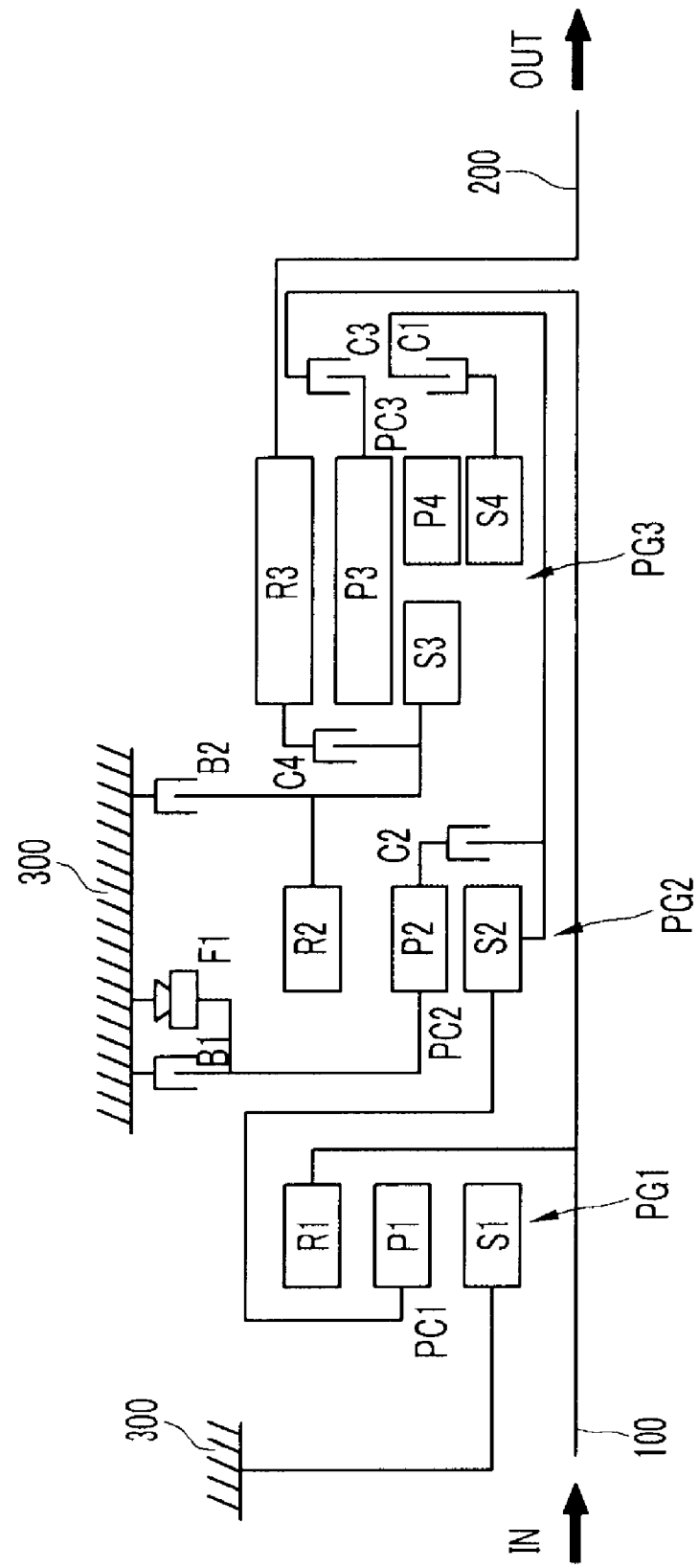
FIG. 14 is a schematic diagram of a power train of an automatic transmission according to an eighth exemplary embodiment of the present invention.
Figure 15:
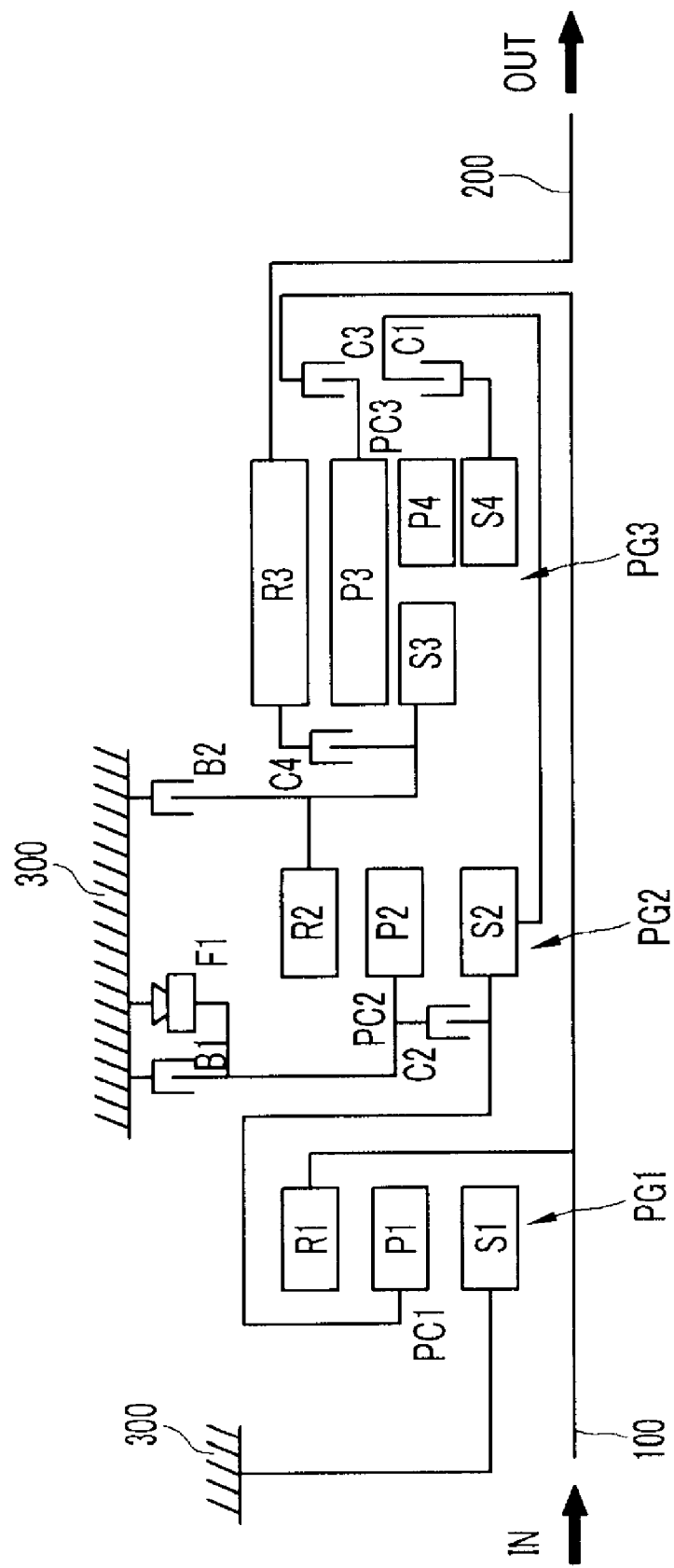
FIG. 15 is a schematic diagram of a power train of an automatic transmission according to a ninth exemplary embodiment of the present invention.
Figure 16:
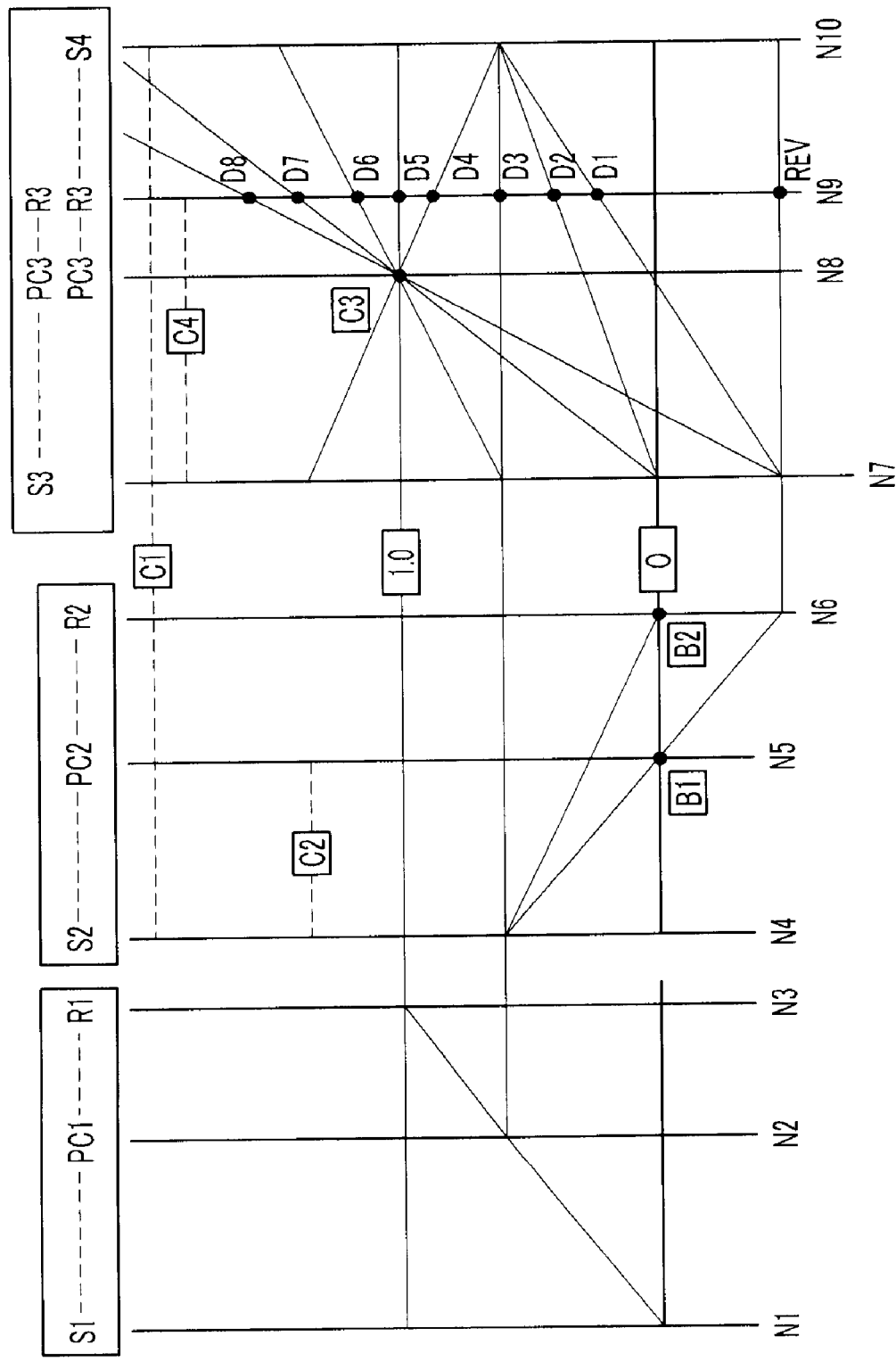
FIG. 16 is a lever diagram showing shifting processes from a first forward speed to an eighth forward speed and one reverse speed in a power train of an automatic transmission according to the eighth and ninth exemplary embodiments of the present invention.

As shown in FIG. 14 and FIG. 15, the power trains of an automatic transmission according to the eighth and ninth exemplary embodiments of the present invention are similar to the power train of an automatic transmission according to the fifth exemplary embodiment of the present invention except for the operating members connected by the second clutch C2 and the position of the second clutch C2. A detailed description of the components that are identical to those of the fifth embodiment will be omitted.

According to the eighth and ninth exemplary embodiments of the present invention, the second clutch C2 selectively connects the fourth operating member to the fifth operating member. In addition, the first brake B1 and the one-way clutch F1 are disposed between the first planetary gear set PG1 and the second planetary gear set PG2, the fourth clutch C4 and the second brake B2 are disposed between the second planetary gear set PG2 and the third planetary gear set PG3, and the first and third clutches C1 and C3 are disposed on the opposite side of the third planetary gear set PG3.

According to the eighth exemplary embodiment of the present invention, the second clutch C2 is disposed between the second planetary gear set PG2 and the third planetary gear set PG3, and according to the ninth exemplary embodiment of the present invention, the second clutch C2 is disposed between the first planetary gear set PG1 and the second planetary gear set PG2.

According to exemplary embodiments of the present invention, eight forward speeds and one reverse speed are attained by using two simple planetary gear sets, one compound planetary gear set, four clutches, and two brakes.

Since many shift speeds are attained, torque of the engine is effectively used, power delivery performance is improved, and fuel consumption is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
an input shaft;
an output gear;
a transmission case;
a first planetary gear set comprising a first operating member fixed to the transmission case, a second operating member receiving torque from the input shaft, and a third operating member outputting a reduced rotational speed by operations of the first and second operating members;
a second planetary gear set comprising a fourth operating member fixedly connected to the third operating member and receiving the reduced rotational speed therefrom, a fifth operating member selectively connected to the transmission case, and a sixth operating member selectively connected to the transmission case or outputting a reverse rotational speed by operations of the fourth and fifth operating members, wherein two of the fourth, fifth, and sixth operating members are selectively connected to each other;
a third planetary gear set comprising a seventh operating member fixedly connected to the sixth operating member and receiving the reverse rotational speed therefrom or selectively connected to the transmission case, an eighth operating member selectively connected to the fourth operating member, a ninth operating member selectively receiving the torque from the input shaft by being selectively connected thereto, and a tenth operating member outputting eight forward speeds and one reverse speed to the output gear by operations of the seventh, eighth, and ninth operating members, wherein two of the seventh, eighth, ninth, and tenth operating members are connected to each other; and
a plurality of friction members selectively connecting the operating members of the first, second, and third planetary gear sets to one of the input shaft, other operating members, or the transmission case.

2. The power train of claim 1, wherein the friction members comprise:
a first clutch selectively connecting the fourth operating member to the eighth operating member;
a second clutch selectively connecting two of the fourth, fifth, and sixth operating members with each other;
a third clutch selectively connecting the ninth operating member to the input shaft;
a fourth clutch selectively connecting two of the seventh, eighth, ninth, and tenth operating members to each other;
a first brake selectively connecting the fifth operating member to the transmission case; and
a second brake selectively connecting the sixth operating member to the transmission case.

3. The power train of claim 2, further comprising a one-way clutch, in parallel with the first brake, disposed between the fifth operating member and the transmission case.

4. The power train of claim 3, wherein the first planetary gear set is a single pinion planetary gear set and comprises a first sun gear, a first planet carrier, and a first ring gear, wherein the first sun gear is the first operating member, the first ring gear is the second operating member, and the first planet carrier is the third operating member.

5. The power train of claim 4, wherein the second planetary gear set is a double pinion planetary gear set and comprises a second sun gear, a second planet carrier, and a second ring gear, wherein the second sun gear is the fourth operating member, the second ring gear is the fifth operating member, and the second planet carrier is the sixth operating member.

6. The power train of claim 5, wherein the third planetary gear set is a compound planetary gear set and comprises a third sun gear, a fourth sun gear, a third planet carrier, and a third ring gear, wherein the third sun gear is the seventh operating member, the fourth sun gear is the eighth operating member, the third planet carrier is the ninth operating member, and the third ring gear is the tenth operating member.

7. The power train of claim 6, wherein the fifth operating member and the sixth operating member are selectively connected with each other by the second clutch.

8. The power train of claim 7, wherein the second and fourth clutches and the second brake are disposed between the second planetary gear set and the third planetary gear set.

9. The power train of claim 7, wherein the second planetary gear set is disposed at a first side of the third planetary gear set, and the first and third clutches are disposed at a second, opposite side of the third planetary gear set.

10. The power train of claim 6, wherein the fourth operating member and the fifth operating member are selectively connected with each other by the second clutch.

11. The power train of claim 10, wherein the second brake and the fourth clutch are disposed between the second planetary gear set and the third planetary gear set.

12. The power train of claim 10, wherein the second clutch is disposed between the first planetary gear set and the second planetary gear set.

13. The power train of claim 10, wherein the second planetary gear set is disposed at a first side of the third planetary gear set, and the first and third clutches are disposed at a second, opposite side of the third planetary gear set.

14. The power train of claim 6, wherein the fourth operating member and the sixth operating member are selectively connected with each other by the second clutch.

15. The power train of claim 14, wherein the second brake and the fourth clutch are disposed between the second planetary gear set and the third planetary gear set.

16. The power train of claim 14, wherein the second planetary gear set is disposed at a first side of the third planetary gear set, and the first and third clutches are disposed at a second, opposite side of the third planetary gear set.

17. The power train of claim 14, wherein the second clutch is disposed between the first planetary gear set and the second planetary gear set.

18. The power train of claim 14, wherein the second clutch is disposed between the second planetary gear set and the third planetary gear set.

19. The power train of claim 4, wherein the second planetary gear set is a single pinion planetary gear set and comprises a second sun gear, a second planet carrier, and a second ring gear, wherein the second sun gear is the fourth operating member, the second planet carrier is the fifth operating member, and the second ring gear is the sixth operating member.

20. The power train of claim 19, wherein the third planetary gear set is a compound planetary gear set and comprises a third sun gear, a fourth sun gear, a third planet carrier, and a third ring gear, wherein the third sun gear is the seventh operating member, the fourth sun gear is the eighth operating member, the third planet carrier is the ninth operating member, and the third ring gear is the tenth operating member.

21. The power train of claim 20, wherein the fourth operating member and the sixth operating member are selectively connected with each other by the second clutch.

22. The power train of claim 21, wherein the first brake and the one-way clutch are disposed between the first planetary gear set and the second planetary gear set.

23. The power train of claim 21, wherein the second and fourth clutches and the second brake are disposed between the second planetary gear set and the third planetary gear set.

24. The power train of claim 21, wherein the second planetary gear set is disposed at a first side of the third planetary gear set, and the first and third clutches are disposed at a second, opposite side of the third planetary gear set.

25. The power train of claim 20, wherein the fifth operating member and the sixth operating member are selectively connected with each other by the second clutch.

26. The power train of claim 25, wherein the first brake and the one-way clutch are disposed between the first planetary gear set and the second planetary gear set.

27. The power train of claim 25, wherein the fourth clutch and the second brake are disposed between the second planetary gear set and the third planetary gear set.

28. The power train of claim 25, wherein the second planetary gear set is disposed at a first side of the third planetary gear set, and the first and third clutches are disposed at a second, opposite side of the third planetary gear set.

29. The power train of claim 25, wherein the second clutch is disposed between the second planetary gear set and the third planetary gear set.

30. The power train of claim 25, wherein the second clutch is disposed between the first planetary gear set and the second planetary gear set.

31. The power train of claim 20, wherein the fourth operating member and the fifth operating member are selectively connected with each other by the second clutch.

32. The power train of claim 31, wherein the first brake and the one-way clutch are disposed between the first planetary gear set and the second planetary gear set.

33. The power train of claim 31, wherein the fourth clutch and the second brake are disposed between the second planetary gear set and the third planetary gear set.

34. The power train of claim 31, wherein the second planetary gear set is disposed at a first side of the third planetary gear set, and the first and third clutches are disposed at a second, opposite side of the third planetary gear set.

35. The power train of claim 31, wherein the second clutch is disposed between the second planetary gear set and the third planetary gear set.

36. The power train of claim 31, wherein the second clutch is disposed between the first planetary gear set and the second planetary gear set.

* * * * *

UNITED STATES PATENT AND TRADEMARK OFFICE
CERTIFICATE OF CORRECTION

PATENT NO. : 7,846,058 B2  Page 1 of 1
APPLICATION NO. : 11/943263
DATED : December 7, 2010
INVENTOR(S) : Woo Yeol Kim It is certified that error appears in the above-identified patent and that said Letters Patent is hereby corrected as shown below:

IN THE TITLE PAGE

(30) Foreign Application Priority Data

Change "June 12, 1920 (KR) ..... 10-2007-0075337"

to --June 12, 2007 (KR) ..... 10-2007-0057337--

Signed and Sealed this
Twenty-second Day of February, 2011

David J. Kappos
*Director of the United States Patent and Trademark Office*